(12) United States Patent
Zhao et al.

(10) Patent No.: US 10,877,800 B2
(45) Date of Patent: Dec. 29, 2020

(54) METHOD, APPARATUS AND COMPUTER-READABLE MEDIUM FOR APPLICATION SCHEDULING

(71) Applicant: EMC IP Holding Company LLC, Hopkinton, MA (US)

(72) Inventors: Junping Zhao, Beijing (CN); Fan Guo, Shanghai (CN); Kun Wang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 98 days.

(21) Appl. No.: 16/162,551

(22) Filed: Oct. 17, 2018

(65) Prior Publication Data

US 2019/0121664 A1    Apr. 25, 2019

(30) Foreign Application Priority Data

Oct. 20, 2017    (CN) .......................... 2017 1 0983591

(51) Int. Cl.
    *G06F 9/46*    (2006.01)
    *G06F 9/48*    (2006.01)
    *G06F 9/50*    (2006.01)

(52) U.S. Cl.
    CPC ............ *G06F 9/4881* (2013.01); *G06F 9/505* (2013.01)

(58) Field of Classification Search
    CPC ............................ G06F 9/4856; G06F 9/4881

(Continued)

(56) References Cited

U.S. PATENT DOCUMENTS

| 7,130,891 B2 * | 10/2006 | Bernardin ............... G06F 9/505 709/218 |
| 7,228,354 B2 * | 6/2007 | Chambliss .......... G06F 11/1076 370/395.4 |

(Continued)

FOREIGN PATENT DOCUMENTS

WO    WO-2018106772 A1 *    6/2018    ............... G06F 9/48

OTHER PUBLICATIONS

Minxian Xu et al.; "A Survey on Load Balancing Algorithms for Virtual Machines Placement in Cloud Computing"; Concurrency and Computation: Practice and Experience Concurrency Computat.: Pract. Exper. 2010.*

*Primary Examiner* — Francisco J Aponte
(74) *Attorney, Agent, or Firm* — Ryan, Mason & Lewis, LLP

(57) ABSTRACT

Embodiments of the present disclosure provide a method, apparatus and computer-readable medium for application scheduling. In accordance with embodiments of the present disclosure, influence factors related to scheduling of a plurality of applications between a plurality of processing units of a computing system are obtained, the plurality of applications being run by at least one of the plurality of processing units. Based on the obtained influence factors, a target application to be scheduled is selected from the plurality of applications and a first processing unit is selected from the plurality of processing units, the first processing unit being different from a second processing unit of the at least one processing unit running the target application. The target application is scheduled from the second processing unit to the first processing unit to continue running of the target application by the first processing unit.

20 Claims, 7 Drawing Sheets

(58) Field of Classification Search
USPC .......................................................... 718/104
See application file for complete search history.

(56) References Cited

U.S. PATENT DOCUMENTS

| | | | | |
|---|---|---|---|---|
| 7,313,560 | B2* | 12/2007 | Dilley, Jr. ............ | G06F 16/214 |
| 7,448,037 | B2* | 11/2008 | Arimilli ............... | G06F 9/5011 |
| | | | | 712/216 |
| 7,593,948 | B2* | 9/2009 | Suggs .................. | G06F 9/5027 |
| 7,600,217 | B2* | 10/2009 | Dostert ................ | G06F 9/544 |
| | | | | 717/114 |
| 7,735,088 | B1* | 6/2010 | Klausler ............... | G06F 9/485 |
| | | | | 718/100 |
| 7,996,484 | B2* | 8/2011 | Mundkur .............. | G06F 13/4022 |
| | | | | 709/213 |
| 8,200,771 | B2* | 6/2012 | Ganesh ................ | G06F 9/4856 |
| | | | | 709/212 |
| 8,310,492 | B2* | 11/2012 | McCrary .............. | G06F 9/3851 |
| | | | | 345/506 |
| 8,429,645 | B2* | 4/2013 | Draper ................. | G06F 8/34 |
| | | | | 717/177 |
| 8,499,023 | B1* | 7/2013 | Harris .................. | H04L 67/02 |
| | | | | 709/201 |
| 8,589,921 | B2* | 11/2013 | Heim ................... | G06F 9/45558 |
| | | | | 718/1 |
| 8,688,628 | B2* | 4/2014 | Riemers ............... | G06F 9/466 |
| | | | | 707/609 |
| 8,745,626 | B1* | 6/2014 | Sandstrom ............ | G06F 9/5027 |
| | | | | 718/102 |
| 8,782,645 | B2* | 7/2014 | Breternitz ............. | G06F 9/5083 |
| | | | | 718/100 |
| 8,869,136 | B2* | 10/2014 | Chapman .............. | G06F 8/77 |
| | | | | 717/174 |
| 8,924,564 | B2* | 12/2014 | Lublin ................. | G06F 15/16 |
| | | | | 709/226 |
| 8,984,523 | B2* | 3/2015 | Vajda ................... | G06F 9/4893 |
| | | | | 718/104 |
| 8,990,527 | B1* | 3/2015 | Linstead .............. | G06F 3/0617 |
| | | | | 711/161 |
| 9,141,625 | B1* | 9/2015 | Thornewell .......... | G06F 16/119 |
| 9,294,097 | B1* | 3/2016 | Vassiliev ............. | H03K 19/17704 |
| 9,531,805 | B1* | 12/2016 | Brown ................. | H04L 67/1091 |
| 9,703,585 | B2* | 7/2017 | Bercovici ............. | G06F 9/4856 |
| 9,830,678 | B2* | 11/2017 | Gandhi ................ | G06T 1/20 |
| 9,858,166 | B1* | 1/2018 | Gong ................... | G06F 11/3447 |
| 9,871,741 | B2* | 1/2018 | Kurtzman ............ | G06F 16/24578 |
| 9,910,618 | B1* | 3/2018 | Curley ................. | G06F 3/0647 |
| 10,069,758 | B2* | 9/2018 | Harned ................ | H04L 41/147 |
| 10,169,065 | B1* | 1/2019 | Nye ..................... | G06F 11/2025 |
| 10,462,012 | B1* | 10/2019 | Rao ...................... | G06F 16/214 |
| 10,558,418 | B2* | 2/2020 | Dutu ..................... | G06F 9/3855 |
| 2003/0120778 | A1* | 6/2003 | Chaboud ............... | G06F 9/5011 |
| | | | | 709/225 |
| 2009/0070771 | A1* | 3/2009 | Yuyitung .............. | G06Q 10/06 |
| | | | | 718/105 |
| 2010/0287560 | A1* | 11/2010 | Neft ..................... | G06F 9/4856 |
| | | | | 718/104 |
| 2010/0325288 | A1* | 12/2010 | Jagadish ............... | G06F 9/54 |
| | | | | 709/227 |
| 2012/0066541 | A1* | 3/2012 | Dournov .............. | G06F 11/0709 |
| | | | | 714/3 |
| 2012/0303799 | A1* | 11/2012 | Hadas .................. | G06F 9/4856 |
| | | | | 709/224 |
| 2013/0054734 | A1* | 2/2013 | Bond .................... | G06F 9/4856 |
| | | | | 709/217 |
| 2013/0166504 | A1* | 6/2013 | Varkhedi .............. | G06F 9/4856 |
| | | | | 707/610 |
| 2013/0227585 | A1* | 8/2013 | Ichikawa ............. | G06F 9/50 |
| | | | | 718/104 |
| 2014/0007059 | A1* | 1/2014 | Stefansson ........... | G06F 9/5072 |
| | | | | 717/140 |
| 2014/0052965 | A1* | 2/2014 | Sarel .................... | G06F 9/4893 |
| | | | | 712/214 |
| 2014/0068581 | A1* | 3/2014 | Chen .................... | G06F 8/451 |
| | | | | 717/149 |
| 2014/0082479 | A1* | 3/2014 | Guinane ............... | G06F 40/14 |
| | | | | 715/234 |
| 2014/0082616 | A1* | 3/2014 | Kurita .................. | G06F 9/455 |
| | | | | 718/1 |
| 2014/0259016 | A1* | 9/2014 | Lottes .................. | G06F 9/4881 |
| | | | | 718/102 |
| 2014/0325503 | A1* | 10/2014 | Li ......................... | G06F 11/34 |
| | | | | 717/177 |
| 2015/0032986 | A1* | 1/2015 | Moore ................. | G06F 9/00 |
| | | | | 711/171 |
| 2015/0150019 | A1* | 5/2015 | Sheaffer ............... | G06F 9/5044 |
| | | | | 718/104 |
| 2015/0304243 | A1* | 10/2015 | Jasperson, Jr. ....... | H04L 47/808 |
| | | | | 709/225 |
| 2016/0004553 | A1* | 1/2016 | Torii .................... | G06F 9/4856 |
| | | | | 718/1 |
| 2016/0011913 | A1* | 1/2016 | Novikov .............. | G06F 9/5077 |
| | | | | 718/1 |
| 2016/0036923 | A1* | 2/2016 | Phanishayee ........ | G06F 9/4856 |
| | | | | 709/217 |
| 2016/0092266 | A1* | 3/2016 | Bavishi ................ | G06F 9/4856 |
| | | | | 718/1 |
| 2016/0110210 | A1* | 4/2016 | Vecera ................. | G06F 9/45558 |
| | | | | 718/1 |
| 2016/0112510 | A1* | 4/2016 | Bai ...................... | H04L 67/1095 |
| | | | | 709/217 |
| 2016/0357473 | A1* | 12/2016 | Kim ..................... | G06F 12/0223 |
| 2016/0371081 | A1* | 12/2016 | Powers ................ | G06F 9/45504 |
| 2016/0378545 | A1* | 12/2016 | Ho ....................... | G06F 9/50 |
| | | | | 718/107 |
| 2017/0005990 | A1* | 1/2017 | Birger .................. | H04L 63/045 |
| 2017/0012854 | A1* | 1/2017 | Balasubramanian .. | |
| | | | | G06F 9/5072 |
| 2017/0123857 | A1* | 5/2017 | Khan ................... | G06F 8/451 |
| 2017/0139729 | A1* | 5/2017 | Cropper ............... | G06F 9/4881 |
| 2017/0139753 | A9* | 5/2017 | Sandstrom ........... | G06F 9/5027 |
| 2017/0142194 | A1* | 5/2017 | Bolshakov ........... | G06F 9/505 |
| 2017/0242779 | A1* | 8/2017 | Alger ................... | G06F 9/44505 |
| 2017/0244788 | A1* | 8/2017 | Bai ...................... | H04L 67/1095 |
| 2017/0262567 | A1* | 9/2017 | Vassiliev ............. | H03K 19/17736 |
| 2017/0315847 | A1* | 11/2017 | Chen .................... | G06F 11/3644 |
| 2017/0364387 | A1* | 12/2017 | Ahmed ................ | G06F 9/4856 |
| 2018/0060120 | A1* | 3/2018 | Nassi ................... | G06F 9/44 |
| 2018/0074848 | A1* | 3/2018 | Cao ...................... | G06F 9/5072 |
| 2018/0123973 | A1* | 5/2018 | Nasser ................. | G06F 9/50 |
| 2018/0217868 | A1* | 8/2018 | Golas .................. | G06F 9/5022 |
| 2018/0239555 | A1* | 8/2018 | Cao ...................... | G06F 3/0647 |
| 2018/0276044 | A1* | 9/2018 | Fong .................... | G06F 9/5044 |
| 2018/0293099 | A1* | 10/2018 | Clohset ................ | G06F 9/4881 |
| 2018/0321946 | A1* | 11/2018 | Hartog ................. | G06T 1/20 |
| 2018/0349199 | A1* | 12/2018 | Vyas .................... | G06F 11/3003 |
| 2019/0034226 | A1* | 1/2019 | Gao ...................... | H04L 61/6009 |
| 2019/0056942 | A1* | 2/2019 | Chen .................... | G06F 15/82 |
| 2019/0319895 | A1* | 10/2019 | Zeng .................... | H04L 47/72 |
| 2020/0034167 | A1* | 1/2020 | Parthasarathy ...... | G06F 9/45558 |
| 2020/0257968 | A1* | 8/2020 | Mitra ................... | G06N 3/08 |

* cited by examiner

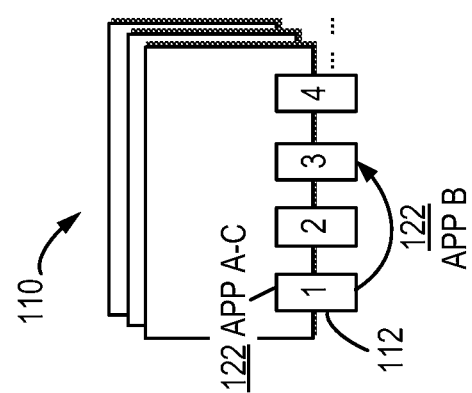

METHOD, APPARATUS AND COMPUTER-READABLE MEDIUM FOR APPLICATION SCHEDULING

RELATED APPLICATIONS

This application claims priority from Chinese Patent Application Number CN 201710983591.2, filed on Oct. 20, 2017 at the State Intellectual Property Office, China, titled "METHOD, APPARATUS, AND COMPUTER-READABLE MEDIUM FOR APPLICATION SCHEDULING" the contents of which are incorporated herein by reference in their entirety.

FIELD

Embodiments of the present disclosure generally relate to the field of data processing, and more particularly, to a method, apparatus and computer-readable medium for application scheduling.

BACKGROUND

Applications on clients may be designed to perform various processing or analysis tasks using computing resources such as processing and storage resources. With growing demands and complexity of tasks such as high-performance computing (HPC), machine learning (ML) or deep learning (DL), and artificial intelligence (AI), a large scale of and/or variable computing resources are needed to allow operations of respective applications. This may be achieved through a machine or system having a plurality of processing units where the application may be scheduled to one or more processing units of the machine or system. For example, a cloud-based computing system has been developed, including machines with one or more processing units. Different clients may rent computing resources of the system (for example, the processing units) as required to run respective applications.

In the case where multiple processing units are available for running multiple applications, due to different initiating times of different applications and different occupied processing and/or storage resource amounts to be occupied, one of the challenges is how to reasonably schedule these applications between the processing units.

SUMMARY

Embodiments of the present disclosure provide a solution for improved application scheduling between a plurality of processing units.

In a first aspect of the present disclosure, there is provided a method of scheduling applications. The method includes obtaining influence factors related to scheduling of a plurality of applications between a plurality of processing units of a computing system, the plurality of applications being run by at least one of the plurality of processing units. The method also includes selecting, based on the obtained influence factors, a target application to be scheduled from the plurality of applications and a first processing unit from the plurality of processing units, the first processing unit being different from a second processing unit of the at least one processing unit running the target application. The method further includes scheduling the target application from the second processing unit to the first processing unit to continue running of the target application by the first processing unit.

In a second aspect of the present disclosure, there is provided an apparatus for scheduling applications. The apparatus includes a processor and a memory coupled to the processor having instructions stored therein, the instructions, when executed by the processor, causing the apparatus to perform acts. The acts include obtaining influence factors related to scheduling of a plurality of applications between a plurality of processing units of a computing system, the plurality of applications being run by at least one of the plurality of processing units. The acts also include selecting, based on the obtained influence factors, a target application to be scheduled from the plurality of applications and a first processing unit from the plurality of processing units, the first processing unit being different from a second processing unit of the at least one processing unit running the target application. The acts further include scheduling the target application from the second processing unit to the first processing unit to continue running of the target application by the first processing unit.

In a third aspect of the present disclosure, there is provided a computer-readable medium having a computer readable instruction stored thereon. The computer-readable instruction, when executed, causes a device to perform the method according to the first aspect.

In a fourth aspect of the present disclosure, there is provided a computer program product being tangibly stored on a non-transient computer readable medium and including machine-executable instructions which, when executed, cause a machine to perform the method according to the first aspect.

This Summary is provided to introduce a selection of concepts in a simplified form that will be further described below in the Detailed Description. This Summary is not intended to identify key or essential features of the present disclosure, nor is it intended to be used to limit the scope of the present disclosure.

BRIEF DESCRIPTION OF THE DRAWINGS

The objectives, advantages and other features of the present disclosure will become more apparent through the detailed description of example embodiments of the present disclosure with reference to the accompanying drawings, where the same reference symbols generally refer to the like elements in the example embodiments of the present disclosure.

FIGS. 3A and 3B illustrates schematic diagrams showing application scheduling between processing units in accordance with an embodiment of the present disclosure;

DETAILED DESCRIPTION OF EMBODIMENTS

Figure 1:
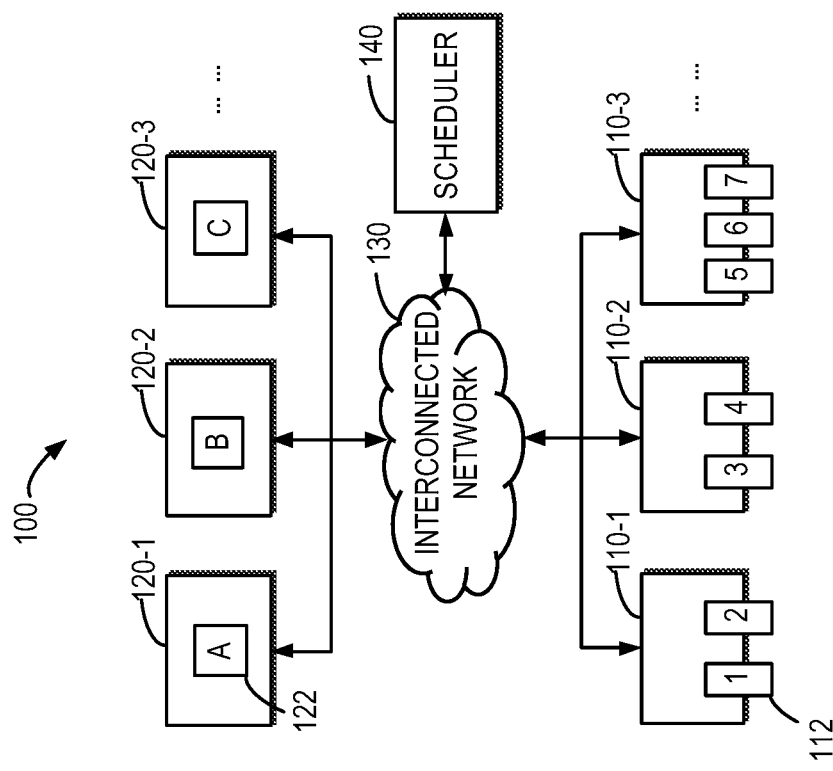
FIG. 1 illustrates a schematic diagram of a computing system in which embodiments of the present disclosure can be implemented.

Principles of the present disclosure will now be described with reference to several example embodiments illustrated in the drawings. Although illustrative embodiments of the present disclosure are shown in the drawings, it is to be appreciated that the description of those embodiments is merely for the purpose of enabling those skilled in the art to better understand and further implement the present disclosure and is not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "an example embodiment" are to be read as "at least one example embodiment." The term "another embodiment" is to be read as at least one further embodiment." The terms "first," "second" or the like can represent different or the same objects. Other definitions, either explicit or implicit, may be included below.

As mentioned above, an application on a client may be run with computing resources provided by a processing unit. A processing unit may be provided by the client locally or by a remote machine or system. In some examples, a cloud-based computing system may be deployed, which includes various machines having one or more processing units. The processing units of the computing system may be utilized by different clients as needed, to schedule respective applications onto available processing units for running.

FIG. 1 illustrates a schematic diagram of a computing system in which embodiments of the present disclosure can be implemented. In the computing system 100, a plurality of machines, such as machines 110-1, 110-2, 110-3 (hereinafter referred to as machines 110 collectively or individually), are deployed for running applications. A machine 110 may be a physical or virtual machine. For example, a machine 110 may be logic, a container or virtual machine, or a physical server or computing device deployed in a datacenter or in a private or public cloud. Each machine 110 has one or more processing units 112 provided thereon. In the example of FIG. 1, the machine 110-1 includes two processing units 112 (i.e., processing units 1, 2), the machine 110-2 includes two processing units 112 (i.e., processing units 3), and the machine 110-3 includes three processing units 112 (i.e., processing units 5 6, 7). A processing unit 112 may be a dedicated processing unit or a universal processing unit. Examples of a processing unit 112 may include, for example, dedicated processing units such as Graphics Processing Units (GPUs), Field-Programmable Gate Arrays (FPGAs) or the like, or general processing units such as Central Processing Units (CPUs) or the like. For purpose of discussion, in some embodiments, GPU will be described as an example of the processing unit 112.

FIG. 1 further illustrates a plurality of clients, such as clients 120-1, 120-2, and 120-3 (hereinafter referred to as clients 120 collectively or individually), each having applications 122 (e.g. applications A, B and C) to be run. A client 120 may be any terminal device, computer or server. An application 122 may be any application executable by the processing unit, which may be designed to perform a respective task, such as a data processing or analysis. As an example, the application 122 may perform a data processing or analyzing task associated with high-performance computing (HPC), machine learning (ML) or deep learning (DL), artificial intelligence (AI) and the like.

In order to run these applications efficiently and/or to reserve local processing resources, the clients 120 may request processing units 112 of the machines 110 to run these applications 122. In such implementation, the clients 120 may be connected to one or more machines 110 via an interconnected network 130 and enable the applications 122 to be run by one or more processing units 112 of the machines 110. Depending on interfaces supported by the clients 120, machines 110 and/or processing units 112, the interconnected network 130 may support different types of wired or wireless connections based on various network transmission techniques, such as Remote Direct Memory Access (RDMA), Transmission Control Protocol (TCP) and the like.

In the computing system 100, the plurality of processing units 112 may be pooled or virtualized for use by the plurality of clients 120 or the plurality of applications 122 therein. In a client 120, virtualized processing units may be exposed for running of the application 122 of the client 120, but the application 122 is actually run by one or more processing units 112 at the side of the machine(s) 110. The client 120 may request use of the processing unit 112 as needed. The computing system 100 further includes a scheduler 140 for scheduling the applications 122 of the clients 120 to be run on one or more processing units 112 of one or more machines 110.

It is to be appreciated that the devices and/or arrangement as shown in FIG. 1 is provided as an example only. In other examples, the computing system 100 may include any suitable number of machines 110 and clients 120. Any suitable number of processing units 112 may be mounted on each machine 110, and each client 120 may include a plurality of applications 122 to be run. Further, although shown separately, in practice, the scheduler 140 may be implemented by other devices that are independent from the machines 110, or may be partly or fully implemented on one or more machines 110.

If there is a plurality of processing units available for running a plurality of applications, it needs to determine to which processing unit(s) each application is scheduled for running. In a conventional mechanism, the applications are scheduled only at the initial request phase. Specifically, when the clients request to run the applications, a polling mechanism may be employed to schedule the applications sequentially to different processing units according to an incoming sequence of the requests of the clients. For example, the first requested application is scheduled to a first processing unit, and the following application is scheduled to a second processing unit. If there are only two processing units, a subsequent application is continued to be scheduled to the first processing unit, and so on and so forth. In other conventional mechanisms, the applications may be scheduled randomly or according to the workload of the processing units.

However, according to any of the conventional mechanisms, after an application has been initially scheduled to and run by a specified processing unit, the running of the application is fixed to that processing unit. Such stationary scheduling can hardly be adapted to meet the requirements related to workload of the processing units (including load balancing and resource compaction) and/or quality of service for the applications. For example, in some cases, after the initial scheduling process, a plurality of applications may be scheduled initially to the same processing unit or several processing units for running, resulting in high workload on the processing unit(s) and low workload on other processing units and thus failing to achieve load balancing between all the processing units. Since the applications running on the processing units cannot be rescheduled, the processing unit with high workload may have low operation performance. In some other cases, in order to increase the resource utilization or reduce the device operation cost, it may be desired to schedule more applications onto fewer processing units while satisfying the performance requirement, which can thus achieve the object of resource compaction. The demand of resource compaction is raised due to the fact that the applications may come in burst or a single application may have low resource utilization on the processing units. Similarly to the case of the load balancing, after the applications have been initially scheduled, it may be difficult to meet the requirement of resource compaction.

In addition to the requirements on load balancing and/or resource compaction from the aspect of workload, the requirements associated with the quality of service of the applications can hardly be satisfied in real time in the mechanism of fixed scheduling. For example, due to the fact that more applications may be scheduled to be run on a processing unit, the resource contention between the applications may cause degradation on the quality of service of the specific application previously run on this processing unit. Since it is impossible to reschedule that application or other applications on the processing unit, the specific application may continue running with low quality of service.

From the above analysis, it can be seen that if an application is only scheduled at the initial phase and the initial scheduling of the application cannot be changed as required, the processing unit and/or the application cannot continue operating in a desired manner. Thus, it is desired to reschedule the application run on the processing unit flexibly and dynamically as required.

In accordance with example embodiments of the present disclosure, there is provided a solution of application scheduling. In this solution, while a plurality of applications is run by at least one of a plurality of processing units of a computing system, based on influence factors related to scheduling of the applications between the plurality of processing units, one or more applications are rescheduled to one or more other processing units that are different from those running the applications. The running of the applications is continued by the processing units to which the applications are rescheduled. Therefore, by constantly monitoring the related influence factors, one or more running applications may be scheduled to other processing units flexibly and dynamically, so as to satisfy the requirements related to workload of the processing units and/or the quality of service of the applications.

Various embodiments of the present disclosure will be further described below with reference to specific examples.

Figure 2:
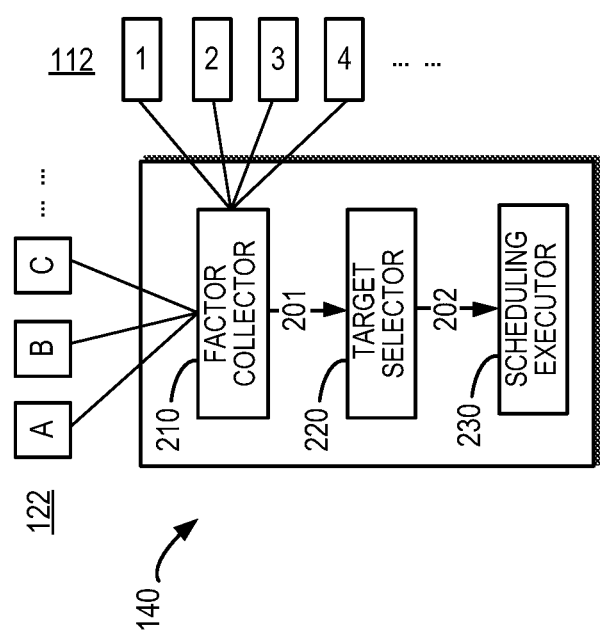
FIG. 2 illustrates a block diagram of an example scheduler for application scheduling in accordance with an embodiment of the present disclosure.

FIG. 2 illustrates an example scheduler in accordance with an embodiment of the present disclosure. The scheduler may be implemented at the scheduler 140 in the computing system 100 in FIG. 1. For purpose of discussion, the scheduler 140 will be described with reference to FIG. 1. As mentioned above, the scheduler 140 may be included in a separate device that is different from the machines 110 that provide the processing units 112, or may be partly or fully implemented in one or more machines 110. Thus, the functionality of the scheduler 140 as described therein may be performed by a controller/processor in the separate device or the machine(s) 110 (e.g., by the processing unit 112 or other general processing units).

As shown in FIG. 2, the scheduler 140 includes a factor collector 210, a target selector 220 and a scheduling executor 230. The factor collector 210 is configured for obtaining influence factors 201 related to scheduling of a plurality of applications 122 between a plurality of processing units 112 of the computing system 100. The applications 122 may be designed to perform data processing or analyzing tasks related to HPC, ML or DL, AI and the like. For the purpose of efficiently running these applications and/or reserving the local processing resource, the clients 120 request to run the applications 122 using the processing units 112 provided by the machines 110. In the embodiments of the present disclosure, a plurality of applications 122 are being run by one or more processing units 112. In other words, a plurality of applications 122 has been scheduled to the respective processing units 112. In accordance with embodiments of the present disclosure, it is desired to reschedule one or some of the applications 122 to other processing units 112 for running.

In some embodiments, the scheduler 140 may be responsible for scheduling the applications 122 between a plurality of processing units 112 on some or all of the machines 110. In some other embodiments, the scheduler 140 may be only responsible for scheduling the applications 122 between the processing units 112 on a single machine 110. The plurality of processing units 112 for which the scheduler 140 is responsible may be of the same type, such as a plurality of GPUs, a plurality of FPGAs, a plurality of CPUs, or the like. The factor collector 210 may collect related influence factors 201 from the processing units 112 under the charge thereof and the applications 122. For purpose of discussion, FIG. 2 shows that the factor collector 210 collects the influence factors 201 from each of the processing units 112 of the computing system 100 (not all shown) and all of the applications 122 being run in the processing units 112.

The influence factors 201 collected by the factor collector 210 are provided to the target selector 220. Based on the influence factors 201, the target selector 220 selects a target application to be scheduled (rescheduled) from the plurality of applications 122 being run, and selects a processing unit from the plurality of processing units 112 to which the target application is to be scheduled. In some embodiments, the target selector 220 may select a plurality of target applications for rescheduling. For convenience of description, the processing unit 112 to which the target application is to be scheduled may be referred to as a first processing unit or a target processing unit herein. The processing unit 112 with the target application 122 running may be referred to as a second processing unit or a source processing unit herein. The target processing unit of the target application is different from the source processing unit that runs the application, and the target processing unit may be located in a same or different machine 110 from where the source processing unit is located.

The selection of the target application and processing unit by the target selector 220 is based on the influence factors 201. In the implementations of the present disclosure, the object of rescheduling the application 122 being run may be, for example, to meet the workload requirement on the plurality of processing units 112 (including load balancing and/or resource compaction) and/or the requirement on the quality of service for the applications 122. The load balancing indicates that the workload generated by the applications 122 is expected to be distributed evenly across the plurality of processing units 112, avoiding extremely high workload on a certain processing unit(s) 112 and low workload or idle status on other processing units 112. The resource compaction indicates that the applications 122 with low workload are not distributed to a large number of processing units 112 but are integrated into a single or a small number of processing units 112 for the purpose of reducing the operation cost and/or improving the resource utilization. During running of the applications 122, the applications 122 with a requirement of a high quality of service can be run by the processing units 112 of sufficient resources, by means of scheduling. In addition to the impact of rescheduling on the application being run and the overall computing performance, the scheduling cost and the like may be taken into consideration as well. In view of these reasons, the related influence factors 201 need to be monitored to support the selection of a proper target application and processing unit. The obtaining of the influence factor 201 and the selection of the targets based thereon will be discussed in detail below.

In some embodiments, the factor collector 210 may obtain resource utilization of the plurality of processing units 112 as influence factors 201. The resource utilization of each processing unit 112 may include the processing resource utilization of the processing unit 112 (for example, an occupancy rate of the GPU core) and/or the storage resource utilization (which may be indicated in percentage). The resource utilization of the processing unit 112 may be taken into consideration in selecting the target application and the target processing unit by the target selector 220.

For the purpose of load balancing, in some embodiments, the target selector 220 may select, based on the resource utilization of the processing unit 112, the target processing unit and the target application in such a way that the differences between the resource utilization of the plurality of processing units 112 is to be reduced after the target application is scheduled from the source processing unit to the target processing unit. As such, the workload on the plurality of processing units 112 tends to be in a balance. In an example, if more resources of a certain processing unit 112 have been utilized, there is a lower probability that this processing unit is selected as the target processing unit during the rescheduling based on the load balancing, and vice versa.

FIG. 3A illustrates an example of application scheduling related to load balancing. This figure illustrates the processing units 112 (including the processing units 1 through 4) on the plurality of machines 110. At an initial phase, the applications 122 A through C are run by the processing unit 112 1, such that the resource utilization of this processing unit 112 is high while the other processing units are idle. In order to reduce the workload of the processing unit 112 1, the target selector 220 of the scheduler 140 may select the application 122 B as the target application and select the processing unit 112 3 as the target processing unit, so as to alleviate the problem of load imbalance across the plurality of processing units 112 after scheduling the application 122 B to the processing unit 112 3.

Figure 3B:
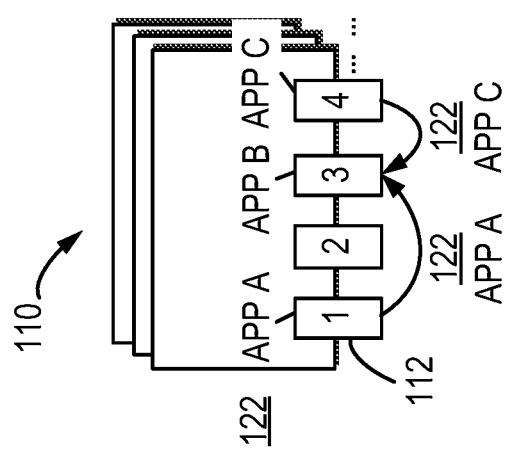

In other examples related to the object of resource compaction, the target processing unit and the target application may be selected to increase the differences of resource utilization of the plurality of processing units 112. Thus, the workload of the plurality of applications 122 is centralized into a certain processing unit(s) 112. In this implementation, the processing unit 112 with more resources being utilized is more likely to be selected as the target processing unit. FIG. 3B illustrates an example of application scheduling related to the resource compaction. In this example, the applications 122 A through C are run by the processing units 112 1, 3 and 4, respectively, and occupy relatively fewer resources of the respective processing units 112. Based on the resource utilization of the processing units 112 1, 3 and 4, the target selector 220 may select the processing unit 112 3 that has a higher workload currently as the target processing unit, and select the applications 122 A and C as the target applications. Such selection enables the workload produced by the plurality of applications 122 to be processed collectively by a smaller number of processing units 112.

In some embodiments, the factor collector 210 may additionally or alternatively obtain resource utilization of each application 122 on the processing unit 112 that is running the application 122. If a certain application 122 is run on a plurality of processing units 112, the factor collector 210 may obtain the resource utilization of the application 122 on each of the plurality of processing units 112. Similar to the total resource utilization of the processing unit 112 per se, the resource utilization of each application 122 on the processing unit 112 may include utilization of the processing resources and/or storage resources of the processing unit 112 (which may be indicated in percentage).

The resource utilization of the application 122 on each processing unit 112 may be used separately or in combination with the total resource utilization of the processing unit 112 for the target selector 220 to select the target application and the target processing unit. With the resource utilization of the application 122 on each processing unit 112, it is possible to estimate the change of the total resource utilization of two processing units 112 more reasonably after a certain application 122 is scheduled from the current processing unit 112 to another processing unit 112. In one example, the target application may be selected as the application 122 having high resource utilization on a single processing unit 112 or high total resource utilization on the plurality of processing units 112 because it will release more resources and thus achieve the corresponding scheduling target more rapidly (for example, the target of increasing or reducing the resource utilization on the plurality of processing units 112).

In addition to the resource utilization or as an alternative, the factor collector 210 may also obtain information related to a topology of the plurality of processing units 112 as an influence factor 201. Some or all of the processing units 112 of a machine 110 may be interconnected with one another via interfaces, or connected with other machines 110 and/or the networks via interfaces. The information related to a topology of the plurality of processing units 112 may include a connection hop number (also referred to as a connection distance) between the plurality of processing units 112, specifically including how many interfaces and/or other devices that are passed from one processing unit 112 to another processing unit 112 connected therewith.

The information related to the topology may further include types of the connections between the plurality of processing units 112. The types of connections are related to ports provided for the processing units 112 and the machines 110 and/or the transmission protocols on which the connections are based. As an example, a type of connection may include NVlink, a Peripheral Component Interconnect (PCI)-Express (PCI-e) switch, a PCI-e root component (for example, a root bridge), a Non-Uniform Memory Access Architecture (NUMA) Quick Path Interconnect (QPI), RDMA over Converged Ethernet (RoCE) (for a connection across networks), and the like. It is to be appreciated that various connections, either currently existing or to be developed in the future, would be utilized for connecting the processing units 112 within a machine 110 or between the machines 110.

Figure 4:
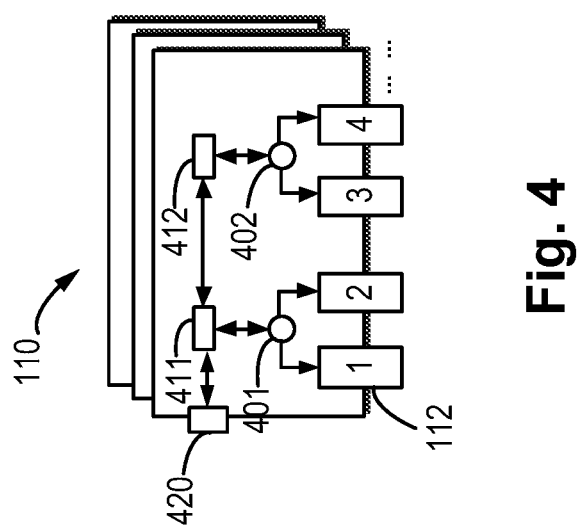
FIG. 4 illustrates a schematic diagram of a topology structure of a plurality of processing units in according with an embodiment of the present disclosure.

FIG. 4 illustrates an example topology structure of a plurality of processing units 112. As shown in FIG. 4, the processing unit 112 1 and the processing unit 112 2 are interconnected with each other via a PCI-e switch 401, and the processing unit 112 3 and the processing unit 112 4 are interconnected with each other via a PCI-e switch 402. The switches 401 and 402 are connected to CPU socket interfaces 411 and 412 respectively, where the interfaces 411 and 412 are interconnected via a QPI connection. In addition, the interface 411 is also connected to a RoCE port 420 such that the processing units 112 1 through 112 4 may be connected via the port 420 to other devices or processing units. As can be seen from FIG. 4, the processing units 112 within a machine 110 may use one type of connection to connect with each other and may use other types of connections in order to connect to the processing units 112 in other machines 110.

Information related to the topology of the plurality of processing units 112 may have an impact on the scheduling cost in selection of the target application and the target processing units. Typically, if it is determined to schedule a particular application 122 running on a processing unit 112 to another processing unit 112, data related to the application 122 may be migrated from the original processing unit 112 to the processing unit 112 (specifically, to the storage resource related to the processing unit 112). The migration cost is related to the connection hop number (i.e., the connection distance) between the two processing units 112 and/or the types of connections. If the number of the connection hops is great, which means that the connection distance between the two processing units 112 is far, then the migration cost is probably increased accordingly. Moreover, the processing and the time consumption during migration process are different if the data is migrated over different types of connections. For example, data migration between two processing units 112 connected via a NVlink interface is more efficient than data migration between two processing units 112 connected via a PCIe switch or NUMA QPI interface.

In one implementation, the factor collector 210 may store information related to the topology of the plurality of processing units 112 as a topology matrix which indicates the connection between each processing unit 112 with another processing unit 112 and a cost score of application scheduling therebetween. The target selector 220 may select the target application and the target processing unit based on such information so that the cost for migrating the data associated with the target application from its source processing unit to the target processing unit can meet a predefined criteria (for example, less than a specific threshold or having a minimum total cost).

In addition to the topology of the processing unit 112, the cost of application scheduling between different processing units may also be based on the data amount to be migrated as required by the target application to be scheduled. The data amount may be indicated by the resource utilization applied to the source application being running. If more resources are currently occupied by the application, more data are needed to be migrated if the application is scheduled. Therefore, in some embodiments, the target selector 220 may combine a plurality of factors provided by the factor collector 210 to select the target application and the target processing unit. For example, the target application and the target processing unit may be selected so as to meet the corresponding scheduling target (for example, load balancing, resource compaction and/or ensuring the quality of service), without causing a high scheduling cost.

Various influence factors 201 have been described above. The factor collector 210 may obtain, through the processing unit drive or virtual drive software in the machines 110, resource utilization of each processing unit 112, resource utilization of each application 122 on a single processing unit 112 and/or information related to the topology of the plurality of processing units 112. It is also possible to collect these factors in other manners. In some embodiments, the factor collector 210 may continuously monitor one or more of these influence factors 201, and store and update constantly the monitored information. For example, the factor collector 210 may monitor the processing units 112 and/or real-time utilization of each application 122 in identical or different intervals. The factor collector 210 may update information related to the topology of the plurality of processing units 112 in relatively longer intervals.

The selection of the target application and the target processing unit has been discussed above by considering the workload of the processing units 112 and the scheduling cost. In some embodiments, the quality of service of the applications 122 may be additionally or alternatively taken into account. In some cases, the requirement on the quality of service for an application 122 may also be referred to as a Service-Level Agreement (SLA) requirement. In the example of purchasing cloud computing resources on demand, the requirement on the quality of service for each application 122 may be related to the corresponding client 120 or the user's payment for resources. Of course, in other cases, the requirement on the quality of service for the application 122 is set by the user and/or the operator. The scope of the present disclosure is not limited in this regard.

Priorities of the applications 122 may be determined based on the quality of service for the applications 122. The application 122 with a requirement on a higher quality of service may be provided with a higher priority. The target selector 220 may select the target application and the target processing unit based on the priorities of the applications 122. Specifically, the target application and the target processing unit may be selected in such a way that the application 122 of a high priority (for example, having a requirement on a high quality of service) is able to be run by the processing unit(s) 112 having sufficient resources. At this time, the application 122 of a high priority may be selected as the target application to be rescheduled or may be maintained at the source processing unit. The application 122 having a low quality of service may be scheduled or maintained at the processing unit 112 with high resource utilization for running. In some embodiments, the priority of the application 122 may be combined with the influence factors 201, as mentioned above, for selecting the target application and the target processing unit using the target selector 220.

In some embodiments, the target selector 220 may assign, based on the influence factors 201 and probably based on the priorities of the applications 122, respective scores to possible solutions for scheduling the plurality of applications 122 across the plurality of processing units 112, and select the target application and the target processing unit based on the scores. The scores may include benefit scores and cost scores. The target selector 220 may assign a benefit score based on an improvement to the scheduling target (e.g., satisfaction of load balancing, resource compaction and/or the quality of service) after a given application 122 is scheduled to a given processing unit 112 and assign a cost score based on the scheduling cost of the application 122 between two processing units 112. In selecting the target application and the target processing unit, the target selector 220 may select and schedule the target application involved in the respective scheduling solution to the target processing unit based on the benefit sores and/or the cost scores. It is to be appreciated that the target selector 220 may perform the selection using the respective factors as discussed above in any other manner.

Still referring to FIG. 2, in the scheduler 140, the target selector 220 provides the selected target application and target processing unit as information 202 to a scheduling executor 230. The scheduling executor 230 is configured to schedule the target application from the source processing unit to the target processing unit for further running of the target processing unit. The scheduling of the target application may include migrating data related to the application from the source processing unit to the target processing unit. In order to relieve the impact of scheduling the target application on its running of this application, a heat transfer technology may be used for migrating data. During data migration, the running of the target application may be suspended and then resumed after being scheduled to the target processing unit.

In some embodiments, data migration involved in the process of the target application scheduling may be performed by a migration executor (not shown) in the computing system 100. The migration executor is also referred to as a migration engine or a migration module. The scheduling executor 230 may send a migration request to the migration executor to activate the migration executor to schedule the target application from the source processing unit to the target processing unit. The migration request may include an identifier of the target application, an identifier of the source processing unit of the target application and an identifier of the target processing unit. Depending on the actual practice, the migration executor may be implemented at one or more machines 110 or at a device separated from the machine(s) 110, or may be combined in the scheduler 140. It is to be appreciated that the scope of the embodiments of the present disclosure is not limited in this regard. Any technology, either currently existing or to be developed in the future, may be used for performing application data migration across processing units.

In some embodiments, the scheduler 140 may perform the scheduling based on a predetermined strategy. In addition to monitoring or updating the related factors by the factor collector 210 in predetermined time intervals, the scheduler 140 may determine whether or not to trigger the selection and scheduling of the target application and the target processing unit in the same or different predetermined time intervals. Alternatively, or in addition, the scheduler 140 may also trigger the scheduling based on an event. For example, for the purpose of load balancing, if it is monitored that a difference between resource utilization of one or more processing units 112 and resource utilization of other processing units 112 (or with average resource utilization) is greater than a predetermined threshold, the target selector 220 is triggered to select the target application and the target processing unit for scheduling. In order to achieve resource compaction, when a plurality of processing units 112 runs the applications 122 and the resource utilization rate of each processing unit 112 is less than a predetermined threshold, the application scheduling is triggered. Alternatively, or in addition, the scheduling in the scheduler 140 may be triggered if the requirement on a quality of service for the application 122 cannot be satisfied.

Although two different targets of scheduling (i.e., load balancing and resource compaction) have been discussed, in some embodiments, the scheduler 140 may satisfy the two scheduling targets at the same time. For example, the resource utilization of the plurality of processing units 112 may be continuously monitored. If it is found, based on monitoring, that the workload on several processing units 112 is too high or the applications 122 occupying less resources are distributed to a large number of processing units 112, the scheduling in the scheduler 140 may be triggered. In addition, during the scheduling process, the scheduler 140 may balance the targets of load balancing and resource compaction when selecting the target application and the target processing unit, so as to avoid extreme imbalance of workload and too much dispersion of the workload at the same time.

The embodiments of application scheduling in accordance with the present disclosure have been described based on the computing system 100 in FIG. 1. In these embodiments, the applications 122 from the clients 120 are scheduled to the processing units 112 on the machines 110 that are different from the clients 120 for running. It is to be appreciated that, in other embodiments, a plurality of local applications may also be scheduled between processing units of a client (for example, a server or computing device), and the scope of the embodiments of the present disclosure is not limited in the aspect of where the applications and the processing units are originated.

Figure 5:
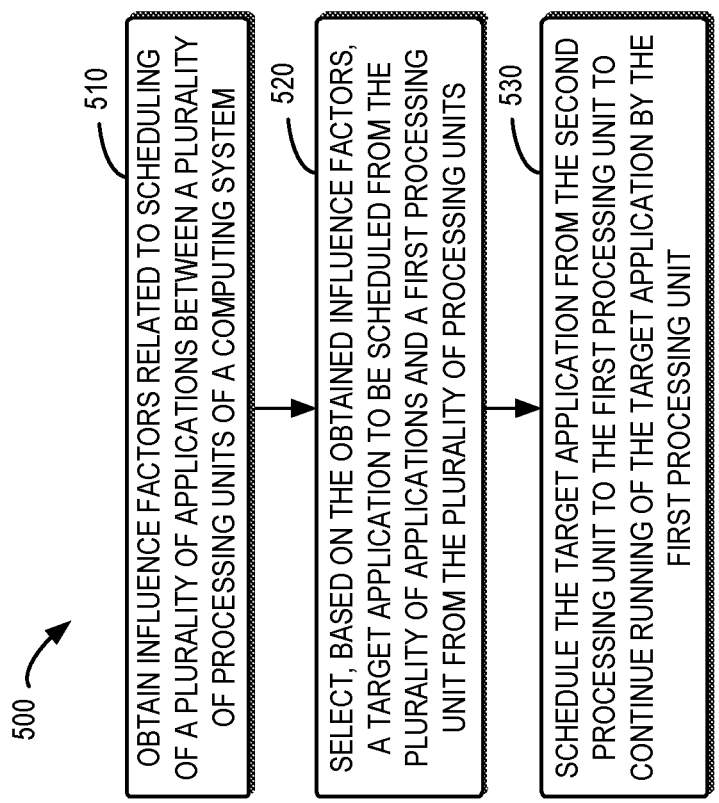
FIG. 5 illustrates a flowchart of a process of application scheduling in accordance with an embodiment of the present disclosure.

FIG. 5 is a flowchart illustrating a process 500 of application scheduling in accordance with an embodiment of the present disclosure. The process 500 may be performed by the scheduler 140 as described with reference to FIG. 1 and FIG. 2. For purpose of illustration, the process 500 will be described below with reference to FIG. 1 and FIG. 2.

At 510, the scheduler 140 obtains influence factors related to scheduling of a plurality of applications 122 between a plurality of processing units 112 of a computing system 100. The plurality of applications 122 is being run by at least one of the plurality of processing units 112. At 520, the scheduler 140 selects, based on the obtained influence factors, a target application to be scheduled from the plurality of applications 122 and a first processing unit from the plurality of processing units 112. The first processing unit is different from a second processing unit of the at least one processing unit 112 running the target application. At 530, the scheduler 140 schedules the target application from the second processing unit to the first processing unit to continue running of the target application by the first processing unit.

In some embodiments, obtaining the influence factors 201 includes obtaining at least one of the following: resource utilization of the plurality of processing units 112, resource utilization of each of the plurality of applications 122 on each of the plurality of processing units 112 running the application 122, and information related to a topology of the plurality of processing units 112, the information comprising at least one of a connection hop number and a type of connection between the plurality of processing units 112.

In some embodiments, selecting the target application and the first processing unit includes: selecting the target application and the first processing unit, such that differences between resource utilization of the plurality of processing units 112 is to be reduced after the target application is scheduled to the first processing unit.

In some embodiments, selecting the target application and the first processing unit includes: selecting the target application and the first processing unit, such that differences between resource utilization of the plurality of processing units 112 is to be increased after the target application is scheduled to the first processing unit.

In some embodiments, selecting the target application and the first processing unit includes: selecting the target application and the first processing unit, such that a predefined criteria for a cost of migrating data associated with the target application from the second processing unit to the first processing unit is to be satisfied, the cost being based on at least one of a connection hop number and one or more types of connections between the second processing unit and the first processing unit.

In some embodiments, selecting the target application and the first processing unit further includes: selecting the target application and the first processing unit further based on priorities of the plurality of applications 122, the priorities being at least related to service quality requirements of the plurality of applications 122.

In some embodiments, the plurality of processing units 112 are comprised in a single machine 110 of the computing system 100. In some other embodiments, the plurality of processing units 112 is distributed over a plurality of machines 110 of the computing system 100.

In some embodiments, the plurality of processing units 112 is of a same type and selected from one of the following: graphics processing units (GPUs), field-programmable gate arrays (FPGAs) and central processing units (CPUs).

Figure 6:
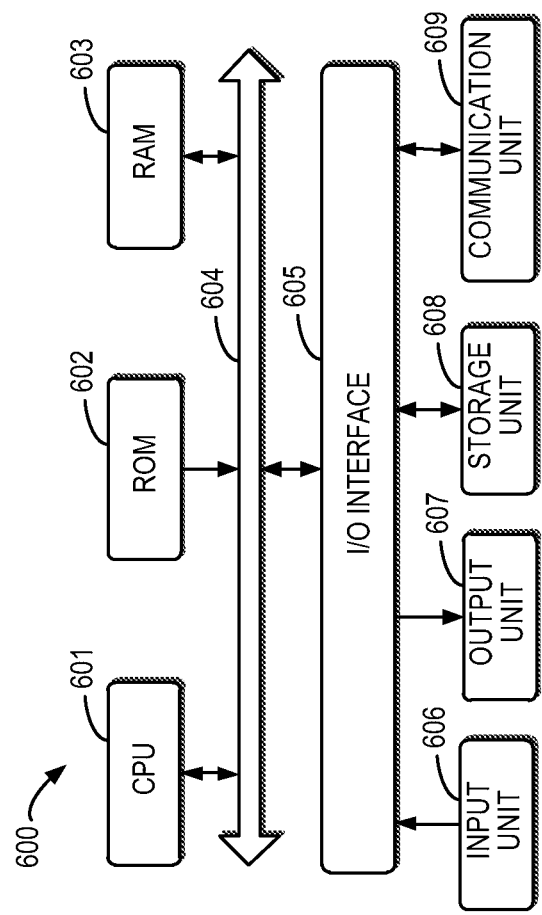
FIG. 6 illustrates a block diagram of an example device that can implement embodiments of the present disclosure.

FIG. 6 is a block diagram illustrating an example device 600 that can implement embodiments of the present disclosure. The device 600 can be provided for implementing the scheduler 140 of FIGS. 1 and 2 or may be a part of the scheduler 140. As shown, the device 600 includes a central processing unit (CPU) 601, which can execute various suitable actions and processing based on the computer program instructions stored in the read-only memory (ROM) 602 or computer program instructions loaded in the random-access memory (RAM) 603 from a storage unit 608. The RAM 603 can also store all kinds of programs and data required by the operations of the device 600. CPU 601, ROM 602 and RAM 603 are connected to each other via a bus 604. The input/output (I/0) interface 605 is also connected to the bus 604.

A plurality of components in the device 600 is connected to the I/O interface 605, including: an input unit 606 such as a keyboard, a mouse and the like; an output unit 607 such as various types of displays, loudspeakers and the like; a storage unit 608 such as a disk, an optical disk, and the like; and a communication unit 609 such as a network card, a modem, a wireless communication transceiver, and the like. The communication unit 609 allows the device 600 to exchange information/data with other devices via the computer network, such as Internet, and/or various telecommunication networks.

The CPU 601 performs various methods and processes as described above, such as the process 500. For example, in some embodiments, the process 500 can be implemented as a computer software program which is tangibly included in a machine readable medium, such as a storage unit 608. In some embodiments, the computer program can be partially or fully loaded and/or installed to the device 600 via a ROM 602 and/or a communication unit 609. When the computer program is loaded to the RAM 603 and executed by the CPU 601, one or more steps of the process 500 as described above can be implemented. Alternatively, in other embodiments, the CPU 601 can be configured via any other suitable manners (e.g., by means of firmware) to execute the process 500.

Those skilled in the art would understand that various steps of the method of the disclosure above may be implemented via a general purpose computing device, which may be integrated on a single computing device or distributed over a network consisting of a plurality of computing devices. Alternatively, they may be implemented with program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It is to be appreciated that although several means or sub-means of the apparatus have been mentioned in the detailed description above, such partition is only by way of example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

The embodiments that have been mentioned above are only some optional embodiments of the present disclosure and do not limit the present disclosure. For those skilled in the art, the present disclosure may have various alternations and changes. Any modifications, equivalents and improvements made within the spirit and principles of the present disclosure should be included within the scope of the present disclosure.

We claim:

1. A method of scheduling applications, comprising:
  obtaining influence factors related to scheduling of a plurality of applications between a plurality of processing units of a computing system, the plurality of applications being run by at least one of the plurality of processing units;
  selecting, based on the obtained influence factors, a target application to be scheduled from the plurality of applications and a first processing unit from the plurality of processing units, the first processing unit being different from a second processing unit of the at least one processing unit running the target application; and
  scheduling the target application from the second processing unit to the first processing unit to continue running of the target application by the first processing unit;
  wherein obtaining the influence factors comprises obtaining at least one of:
    (i) resource utilization of the plurality of processing units,
    (ii) resource utilization of each of the plurality of applications on each of the plurality of processing units running the application, and
    (iii) information related to a topology of the plurality of processing units, the information comprising at least one of a connection hop number and a type of connection between at least a subset of the processing units, the connection hop number being between multiple ones of the plurality of processing units, the information being based at least in part on at least one of number of interfaces and number of other devices; and
  wherein selecting the target application and the first processing unit comprises:
  assigning scores to respective ones of a plurality of distinct possible solutions based on the obtained influence factors, the assigned scores comprising at least one of:
    (i) a benefit score characterizing an improvement to one or more of load balancing, resource compaction and quality of service after a given application is scheduled to a given processing unit, and
    (ii) a cost score characterizing a scheduling cost of the given application to the given processing unit; and
  selecting the target application and the first processing unit based on the assigned scores.

2. The method of claim 1, wherein selecting the target application and the first processing unit comprises:
  selecting the target application and the first processing unit, such that differences between resource utilization of the plurality of processing units is to be reduced after the target application is scheduled to the first processing unit.

3. The method of claim 1, wherein selecting the target application and the first processing unit comprises:
  selecting the target application and the first processing unit, such that differences between resource utilization of the plurality of processing units is to be increased after the target application is scheduled to the first processing unit.

4. The method of claim 1, wherein selecting the target application and the first processing unit comprises:
  selecting the target application and the first processing unit, such that a predefined criteria for a cost of migrating data associated with the target application from the second processing unit to the first processing unit is to be satisfied, the cost being based on at least one of a connection hop number and one or more types of connections between the second processing unit and the first processing unit.

5. The method of claim 1, wherein selecting the target application and the first processing unit further comprises:
  selecting the target application and the first processing unit further based on priorities of the plurality of applications, the priorities being at least related to service quality requirements of the plurality of applications.

6. The method of claim 1, wherein the plurality of processing units are comprised in a single machine of the computing system.

7. The method of claim 1, wherein the plurality of processing units are distributed over a plurality of machines of the computing system.

8. The method of claim 1, wherein the plurality of processing units is of a same type and selected from one of the following:
  graphics processing units (GPUs),
  field programmable gate arrays (FPGAs), and
  central processing units (CPUs).

9. An apparatus for scheduling applications, comprising:
  a processor; and
  a memory coupled to the processor having instructions stored therein, the instructions, when executed by the processor, causing the apparatus to perform acts comprising:
  obtaining influence factors related to scheduling of a plurality of applications between a plurality of processing units of a computing system, the plurality of applications being run by at least one of the plurality of processing units;
  selecting, based on the obtained influence factors, a target application to be scheduled from the plurality of applications and a first processing unit from the plurality of processing units, the first processing unit being different from a second processing unit of the at least one processing unit running the target application; and
  scheduling the target application from the second processing unit to the first processing unit to continue running of the target application by the first processing unit;
  wherein obtaining the influence factors comprises obtaining at least one of:
    (i) resource utilization of the plurality of processing units,
    (ii) resource utilization of each of the plurality of applications on each of the plurality of processing units running the application, and
    (iii) information related to a topology of the plurality of processing units, the information comprising at least one of a connection hop number and a type of connection between at least a subset of the plurality of processing units, the connection hop number being between multiple ones of the plurality of processing units, the information being based at least in part on at least one of number of interfaces and number of other devices; and
  wherein selecting the target application and the first processing unit comprises:
  assigning scores to respective ones of a plurality of distinct possible solutions based on the obtained influence factors, the assigned scores comprising at least one of:
    (i) a benefit score characterizing an improvement to one or more of load balancing, resource compaction and quality of service after a given application is scheduled to a given processing unit, and
    (ii) a cost score characterizing a scheduling cost of the given application to the given processing unit; and
  selecting the target application and the first processing unit based on the assigned scores.

10. The apparatus of claim 9, wherein selecting the target application and the first processing unit comprises:
  selecting the target application and the first processing unit, such that differences between resource utilization of the plurality of processing units is to be reduced after the target application is scheduled to the first processing unit.

11. The apparatus of claim 9, wherein selecting the target application and the first processing unit comprises:
  selecting the target application and the first processing unit, such that differences between resource utilization of the plurality of processing units is to be increased after the target application is scheduled to the first processing unit.

12. The apparatus of claim 9, wherein selecting the target application and the first processing unit comprises:
  selecting the target application and the first processing unit, such that a predefined criteria for a cost of migrating data associated with the target application from the second processing unit to the first processing unit is to be satisfied, the cost being based on at least one of a connection hop number and a type of connection between the second processing unit and the first processing unit.

13. The apparatus of claim 9, wherein selecting the target application and the first processing unit further comprises:
  selecting the target application and the first processing unit further based on priorities of the plurality of applications, the priorities being at least related to service quality requirements of the plurality of applications.

14. The apparatus of claim 9, wherein the plurality of processing units are comprised in a single machine of the computing system.

15. The apparatus of claim 9, wherein the plurality of processing units are distributed over a plurality of machines of the computing system.

16. The apparatus of claim 9, wherein the plurality of processing units is of a same type and selected from one of the following:
- graphics processing units (GPUs),
- field programmable gate arrays (FPGAs), and
- central processing units (CPUs).

17. A computer program product tangibly stored on a non-transitory computer-readable medium and comprising computer readable instructions which, when executed, cause a device to perform steps of:
- obtaining influence factors related to scheduling of a plurality of applications between a plurality of processing units of a computing system, the plurality of applications being run by at least one of the plurality of processing units;
- selecting, based on the obtained influence factors, a target application to be scheduled from the plurality of applications and a first processing unit from the plurality of processing units, the first processing unit being different from a second processing unit of the at least one processing unit running the target application; and
- scheduling the target application from the second processing unit to the first processing unit to continue running of the target application by the first processing unit;
- wherein obtaining the influence factors comprises obtaining at least one of:
  - (i) resource utilization of the plurality of processing units,
  - (ii) resource utilization of each of the plurality of applications on each of the plurality of processing units running the application, and
  - (iii) information related to a topology of the plurality of processing units, the information comprising at least one of a connection hop number and a type of connection between at least a subset of the plurality of processing units, the connection hop number being between multiple ones of the plurality of processing units, the information being based at least in part on at least one of number of interfaces and number of other devices; and wherein selecting the target application and the first processing unit comprises:
- assigning scores to respective ones of a plurality of distinct possible solutions based on the obtained influence factors, the assigned scores comprising at least one of:
  - (i) a benefit score characterizing an improvement to one or more of load balancing, resource compaction and quality of service after a given application is scheduled to a given processing unit, and
  - (ii) a cost score characterizing a scheduling cost of the given application to the given processing unit; and
- selecting the target application and the first processing unit based on the assigned scores.

18. The computer program product of claim 17, wherein selecting the target application and the first processing unit comprises:
- selecting the target application and the first processing unit, such that differences between resource utilization of the plurality of processing units is to be reduced after the target application is scheduled to the first processing unit.

19. The computer program product of claim 17, wherein selecting the target application and the first processing unit comprises:
- selecting the target application and the first processing unit, such that differences between resource utilization of the plurality of processing units is to be increased after the target application is scheduled to the first processing unit.

20. The computer program product of claim 17, wherein selecting the target application and the first processing unit comprises:
- selecting the target application and the first processing unit, such that a predefined criteria for a cost of migrating data associated with the target application from the second processing unit to the first processing unit is to be satisfied, the cost being based on at least one of a connection hop number and one or more types of connections between the second processing unit and the first processing unit.

* * * * *